United States Patent
Detwiler et al.

(10) Patent No.: US 11,567,769 B2
(45) Date of Patent: Jan. 31, 2023

(54) DATA PIPELINE CIRCUIT SUPPORTING INCREASED DATA TRANSFER INTERFACE FREQUENCY WITH REDUCED POWER CONSUMPTION, AND RELATED METHODS

(71) Applicant: Microsoft Technology Licensing, LLC, Redmond, WA (US)

(72) Inventors: Thomas Detwiler, Huntsville, AL (US); Steven J. Urish, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 17/129,187

(22) Filed: Dec. 21, 2020

(65) Prior Publication Data

US 2022/0197646 A1 Jun. 23, 2022

(51) Int. Cl.
G06F 9/30 (2018.01)
G06F 1/08 (2006.01)
G06F 9/38 (2018.01)
G06F 13/12 (2006.01)

(52) U.S. Cl.
CPC ............ *G06F 9/30079* (2013.01); *G06F 1/08* (2013.01); *G06F 9/3867* (2013.01); *G06F 13/124* (2013.01)

(58) Field of Classification Search
CPC ...... G06F 9/3867; G06F 1/08; G06F 9/30079; G06F 13/124
See application file for complete search history.

(56) References Cited

U.S. PATENT DOCUMENTS

| | | | |
|---|---|---|---|
| 5,918,042 A | * | 6/1999 | Furber ................... H03K 3/037 712/E9.063 |
| 6,092,167 A | | 7/2000 | Cheung et al. |
| 9,172,379 B1 | * | 10/2015 | How ...................... G06F 30/34 |
| 2004/0068640 A1 | | 4/2004 | Jacobson et al. |

OTHER PUBLICATIONS

"International Search Report and Written Opinion Issued in PCT Application No. PCT/US21/060439", dated Feb. 25, 2022, 13 Pages. (MS# 409172-WO-PCT).

* cited by examiner

*Primary Examiner* — Zachary K Huson
(74) *Attorney, Agent, or Firm* — Withrow & Terranova, PLLC

(57) ABSTRACT

A data pipeline circuit includes an upstream interface circuit that receives sequential data and a downstream interface circuit that transfers the sequential data to a downstream circuit. A ready signal indicates the downstream circuit is ready to receive the sequential data. The data pipeline circuit includes a first data latch, a second data latch and a first status latch. The first data latch receives the sequential data. The first status latch generates an available signal that is asserted to indicate the second data latch is available to receive the sequential data. The second data latch receives the sequential data in response on the available signal being asserted and the ready signal indicating the downstream circuit is not ready to receive the sequential data on the data output. Limiting conditions in which the sequential data is stored in the second data latch significantly reduces power consumption of the data pipeline circuit.

29 Claims, 7 Drawing Sheets

DATA PIPELINE CIRCUIT SUPPORTING INCREASED DATA TRANSFER INTERFACE FREQUENCY WITH REDUCED POWER CONSUMPTION, AND RELATED METHODS

FIELD OF THE DISCLOSURE

The technology of the disclosure relates to transferring digital data between digital logic circuits and more specifically to synchronous data bus interface circuits for controlling digital data transfer.

BACKGROUND

Audio, video, and textual information are processed, transferred, and stored in a binary digital format in large computing systems as well as smaller consumer electronic devices such as laptops and hand-held mobile devices. Integrated circuits (ICs) provide the capabilities of such systems and devices. ICs contain digital logic circuits for processing digital data, memory circuits for storing digital data, and external interfaces for transmitting and receiving digital data between devices and systems. Each binary digit or bit of digital data is represented in a circuit as a voltage level that can be stored in a memory bit cell or a sequential logic element and transferred between circuits on wires. Control signals are used to inform an upstream circuit that a downstream circuit is ready to receive transmitted digital data and inform the downstream circuit that valid data is being transferred. FIG. 1 is an illustration of an upstream circuit 102, a downstream circuit 104, and an interface bus 106 for transferring digital data from the upstream circuit 102 to the downstream circuit 104. The interface bus 106 includes a data bus DBUS(X-1:0), a valid signal VALID, and ready signal READY. The data bus DBUS(X-1:0) includes X signals that each transfer one bit of digital data per cycle from the upstream circuit 102 to the downstream circuit 104. The valid signal VALID is set during a cycle in which the data bus DBUS(X-1:0) is transferring valid data. The ready signal READY is an indication from the downstream circuit 104 to the upstream circuit 102 that valid data on the data bus DBUS(X-1:0) during a cycle will be received.

A system clock signal CLK is distributed to storage circuits, also referred to herein as sequential logic elements, such as latches and flip-flops, in the upstream and downstream circuits 102, 104 to synchronize data storage and transfer. One bit of digital data is transferred on each of the X data wires 108 of the data bus DBUS(X-1:0) in each period or cycle of the system clock signal CLK. In M consecutive cycles of the system clock signal CLK, a total of M×X bits of digital data can be transmitted as sequential dam on the data bus DBUS(X-1:0) that is X bits wide. As the length of the data wires in the data bus DBUS(X-1:0) increase, so does the resistance and capacitance of the data wires 108, which increases delay of a data signal (e.g., voltage level) being received on the data wire 108 in the downstream circuit 104. Since the transfer of data between latches is synchronized by the system clock signal CLK, a propagation delay of a signal transferred between a latch in the upstream circuit 102 and a latch in the downstream circuit 104 is limited to less than a period of the system clock signal CLK. Due to the propagation delay increasing with length of the data wires 108, there is a tradeoff between the maximum frequency of the system clock signal CLK and a maximum length of the data wires 108 on which a signal can propagate within one period of such system clock signal CLK. Data buses for transferring multiple bits of digital data within one clock period can be limited in length in this regard, which affects the time required for transferring data between logic circuits in an IC.

A data pipeline circuit can be inserted into a long propagation path to temporarily store the data signal, breaking the long propagation path into two shorter paths. The data pipeline circuit captures a data signal from the first shorter path in a first clock cycle and transmits the data signal on the second shorter path in a second clock cycle. Although breaking up the long propagation path by temporarily capturing the data signal adds the period of a clock cycle to the latency of the data transfer, the shorter propagation distances of the first and second shorter paths allow the clock frequency of the IC to be increased (e.g., doubled). Increasing the frequency of the system clock signal offsets the increase in data transfer latency when transferring sequential data for many consecutive clock cycles. However, the latches employed in data pipeline circuits increase power consumption.

SUMMARY

Exemplary aspects disclosed herein include a data pipeline circuit supporting increased data transfer interface frequency with reduced power consumption. Related methods of transferring data are also disclosed. A data pipeline circuit transfers sequential data between an upstream circuit and a downstream circuit. The data pipeline circuit includes an upstream interface circuit that receives the sequential data and a downstream interface circuit that transfers the sequential data to the downstream circuit. The downstream interface circuit includes a ready input for receiving a ready signal that indicates the downstream circuit is ready to receive the sequential data on the data output. The data pipeline circuit also includes a logic circuit including a first data storage circuit, a second data storage circuit and a first status circuit. The first data storage circuit receives the sequential data. In an exemplary aspect, the first status circuit generates an available signal that is asserted to indicate the second data storage circuit is available to receive the sequential data. In a further exemplary aspect, the second data storage circuit receives the sequential data in response to the available signal being asserted and the ready signal indicating the downstream circuit is not ready to receive the sequential data on the data output. For example, the second data storage circuit receives the sequential data only in response to the available signal being asserted and the ready indicating the downstream circuit is not ready to receive the sequential data. Limiting conditions in which the sequential data is stored in the second data storage circuit significantly reduces power consumption of the data pipeline circuit.

In another exemplary aspect, a data pipeline circuit configured to transfer sequential data from an upstream circuit to a downstream circuit in an integrated circuit is disclosed. The data pipeline circuit comprises an upstream interface circuit configured to receive sequential data from an upstream circuit and a downstream interface circuit comprising a data output and a ready input, the downstream interface circuit configured to transfer the sequential data received on the upstream interface circuit to a downstream circuit on the data output, wherein a ready signal on the ready input indicates the downstream circuit is ready to receive the sequential data. The data pipeline circuit comprises a logic circuit coupled to the upstream interface circuit and the downstream interface circuit, and the logic circuit comprises a first data storage circuit, a second data storage circuit, and a first status circuit. The first data storage circuit is configured to receive the sequential data from the upstream interface circuit, the second data storage circuit is configured to receive the sequential data, and the first status circuit is configured to assert an available signal to indicate the second data storage circuit is available to receive the sequential data. The second data storage circuit is configured to receive the sequential data in response to the available signal being asserted and the ready signal indicating the downstream circuit, is not ready to receive the sequential data on the data output.

In another exemplary aspect, an integrated circuit comprising an upstream circuit, a downstream circuit, and a data pipeline circuit is disclosed. The data pipeline circuit is configured to transfer sequential data from the upstream circuit to the downstream circuit in an integrated circuit is disclosed. The data pipeline circuit comprises an upstream interface circuit configured to receive sequential data from an upstream circuit and a downstream interface circuit comprising a data output and a ready input, the downstream interface circuit configured to transfer the sequential data received on the upstream interface circuit to a downstream circuit on the data output, wherein a ready signal on the ready input indicates the downstream circuit is ready to receive the sequential data. The data pipeline circuit comprises a logic circuit coupled to the upstream interface circuit and the downstream interface circuit, and the logic circuit comprises a first data storage circuit, a second data storage circuit, and a first status circuit. The first data storage circuit is configured to receive the sequential data from the upstream interface circuit, the second data storage circuit is configured to receive the sequential data, and the first status circuit is configured to assert an available signal to indicate the second data storage circuit is available to receive the sequential data. The second data storage circuit is configured to receive the sequential data in response to the available signal being asserted and the ready signal indicating the downstream circuit is not ready to receive the sequential data on the data output.

In another exemplary aspect, a method of transferring data from an upstream circuit to a downstream circuit in an integrated circuit is disclosed. The method comprises receiving sequential data from an upstream circuit on an upstream interface circuit of a data pipeline circuit and transferring the sequential data received from the upstream interface circuit to a downstream circuit on a downstream interface circuit, the downstream interface circuit comprising a data output and a ready input that receives a ready signal indicating the downstream circuit is ready to receive the sequential data. The method further comprises receiving the sequential data in a first data storage circuit of a logic circuit that further comprises a second data storage circuit and generating, in a first status circuit, an available signal that is asserted to indicate the second data storage circuit is available to receive the sequential data. The method further comprises receiving the sequential data in the second data storage circuit in response to the available signal being asserted and the ready signal indicating the downstream circuit is not ready to receive the sequential data on the data output.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 3:
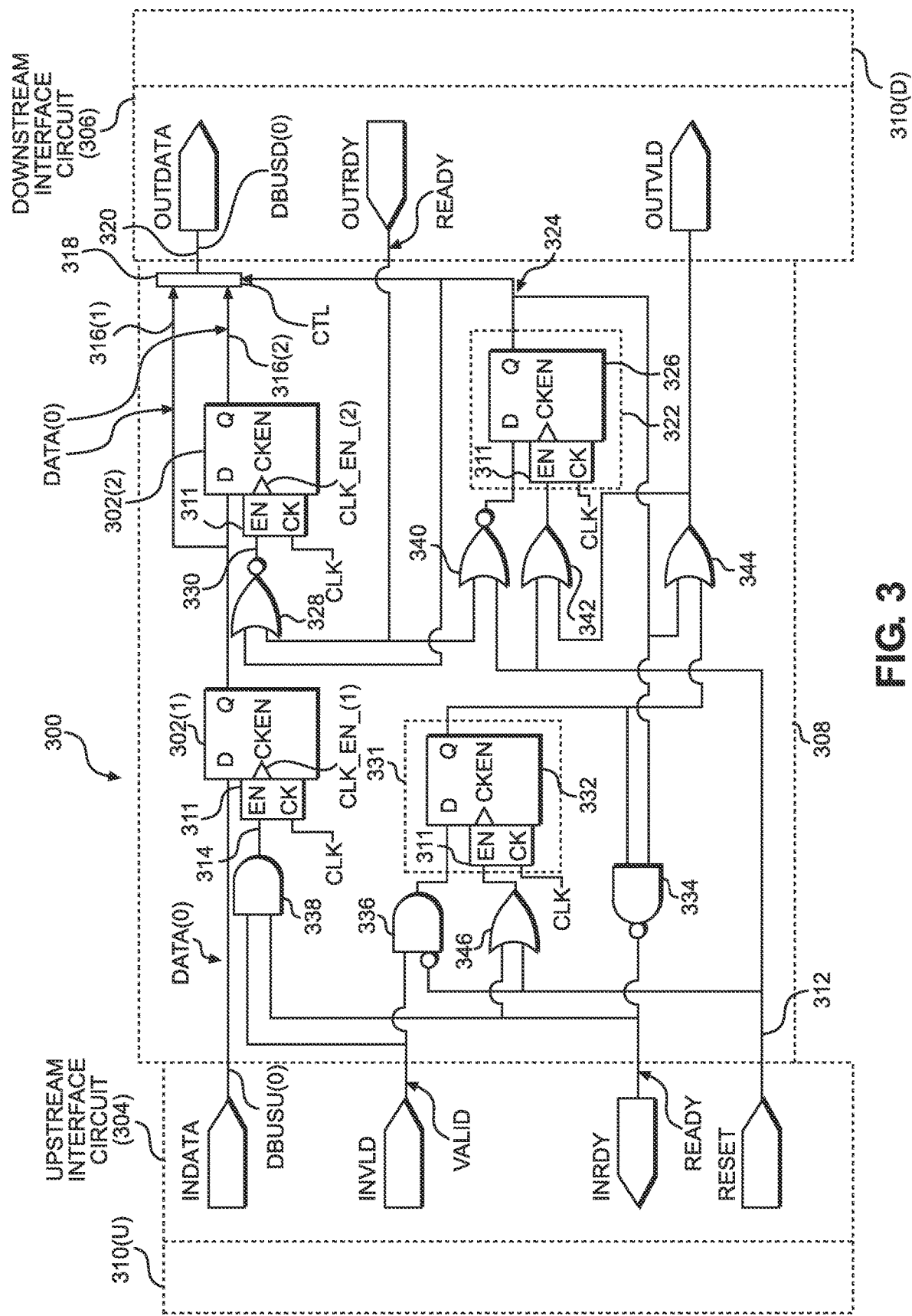
FIG. 3 is a schematic logic diagram of an exemplary data pipeline circuit including first and second data latches for sequential data transfer, in which power consumption in each data bit is reduced by receiving the sequential data in the second data latch in response to a ready signal from a downstream circuit when the second data latch is available.
Figure 6:
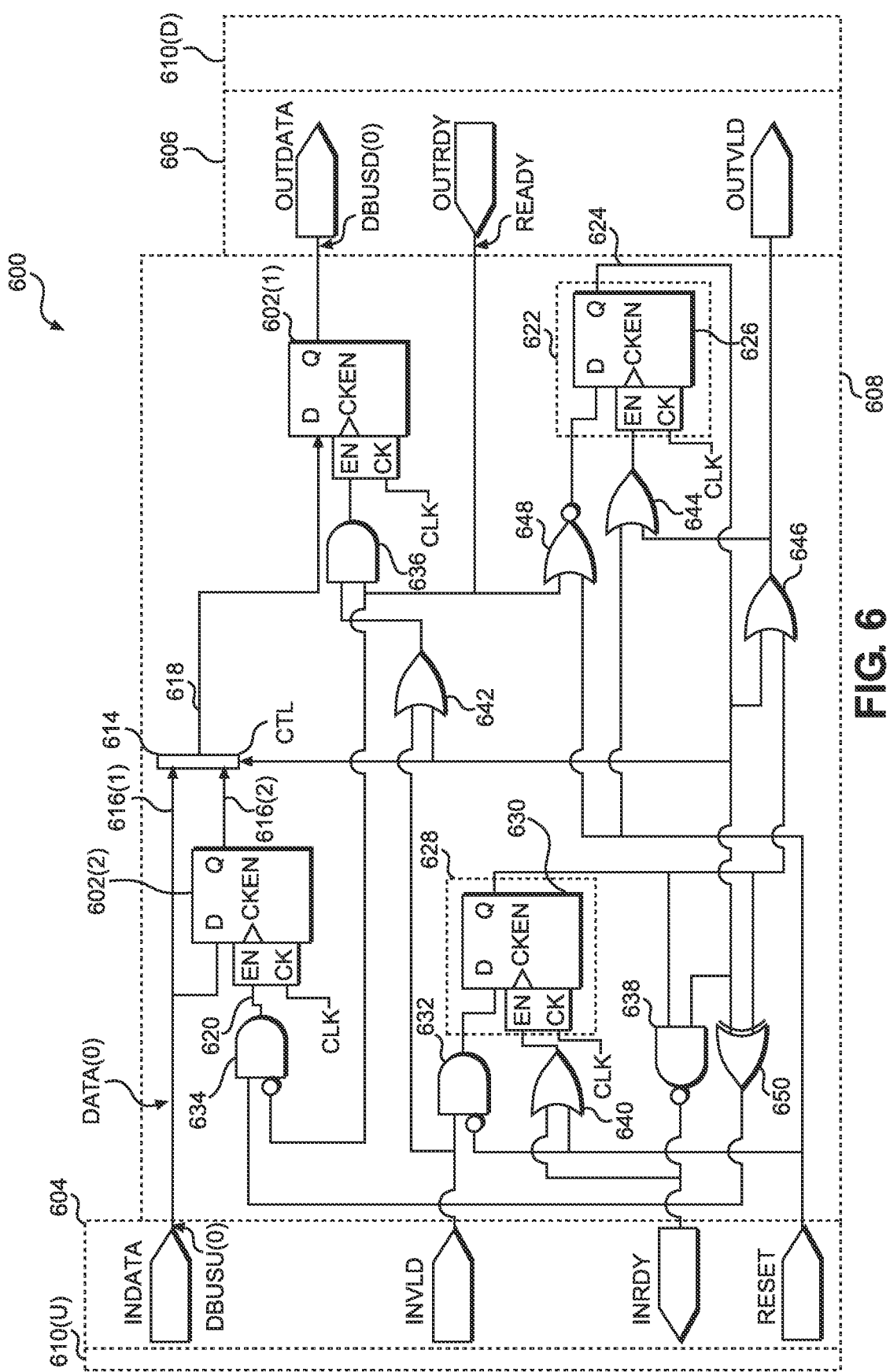
FIG. 6 is a logic diagram of another exemplary data pipeline circuit including first and second data latches for sequential data transfer, in which power consumption in each data bit is reduced by receiving the sequential data in the second data latch in response to a ready signal from a downstream circuit when the second data latch is available.
Figure 7:
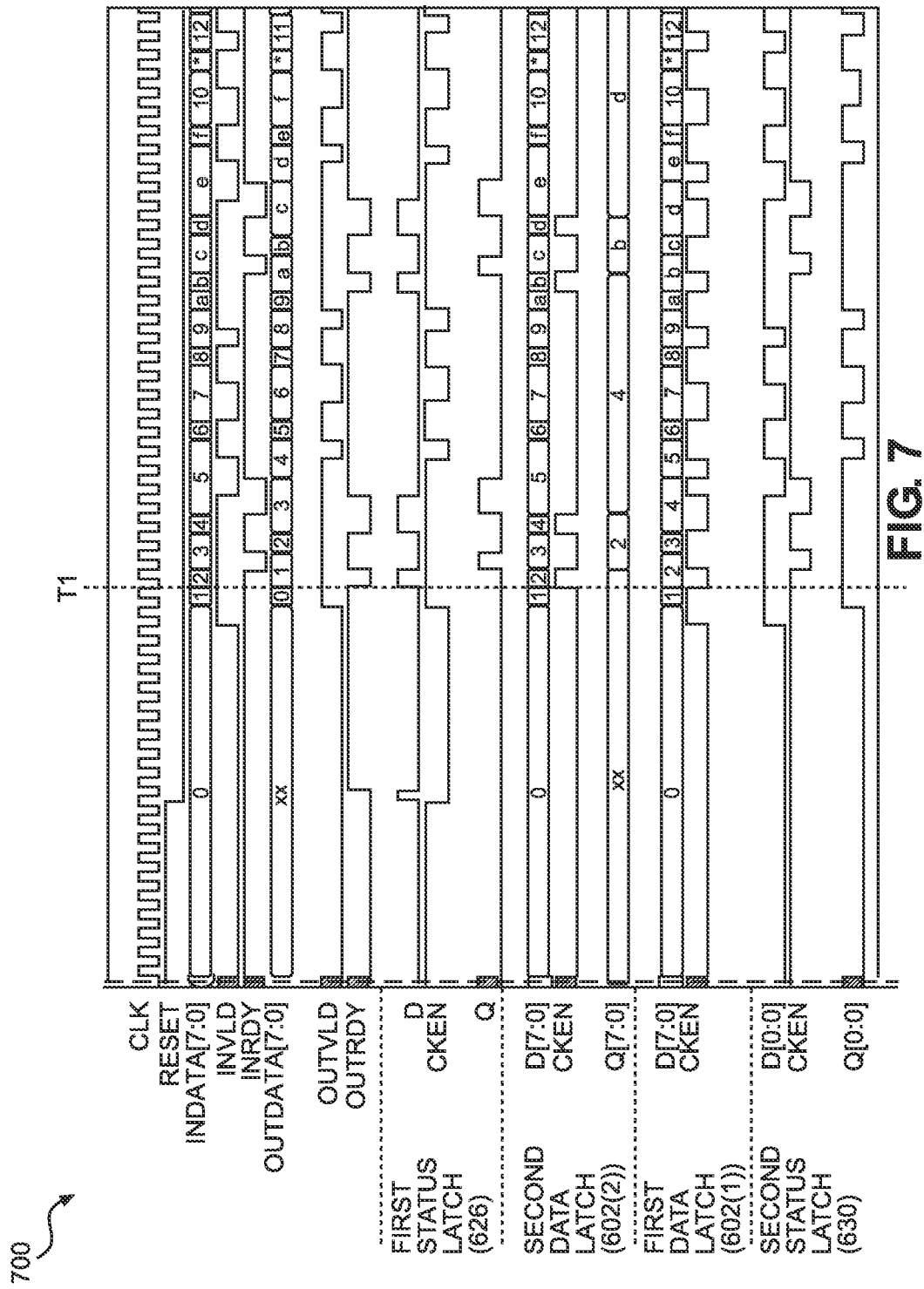
Figure 8:
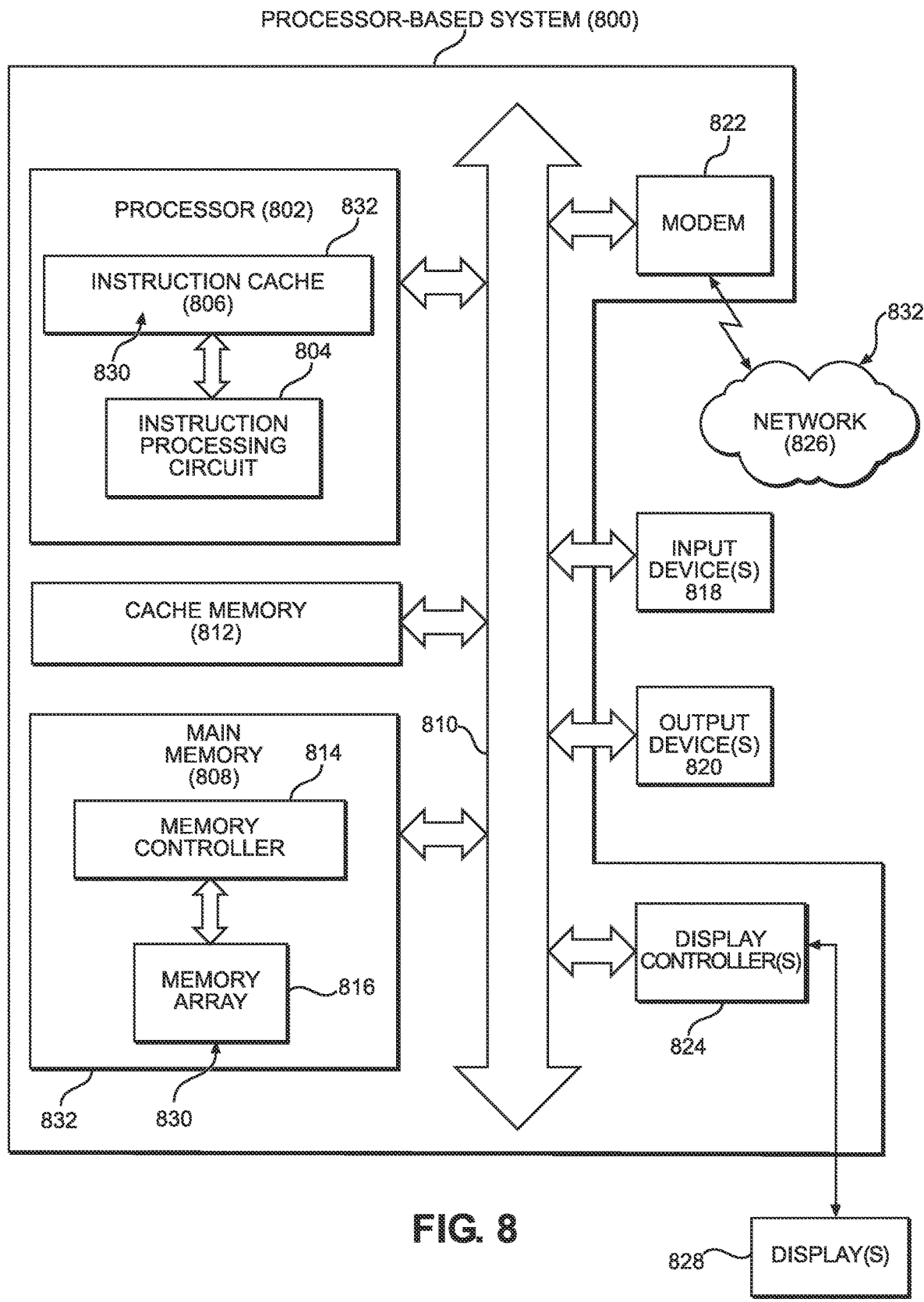

FIG. 7 is a timing diagram illustrating internal and external signals of the data pipeline circuit in FIG. 6 during sequential data transfer between an upstream circuit and a downstream circuit; and FIG. 8 is a block diagram of an exemplary processor-based system including a plurality of devices coupled to a system bus, wherein any component within the processor-based system may employ a data pipeline circuit for transferring sequential data with reduced power consumption as illustrated in FIGS. 3 and 6.

DETAILED DESCRIPTION

Exemplary aspects disclosed herein include a data pipeline circuit supporting increased data transfer interface frequency with reduced power consumption. Related methods of transferring data are also disclosed. A data pipeline circuit transfers sequential data between an upstream circuit and a downstream circuit. The data pipeline circuit includes an upstream interface circuit that receives the sequential data and a downstream interface circuit that transfers the sequential data to the downstream circuit. The downstream interface circuit includes a ready input for receiving a ready signal that indicates the downstream circuit is ready to receive the sequential data on the data output. The data pipeline circuit also includes a logic circuit including a first data storage circuit, a second data storage circuit and a first status circuit. The first data storage circuit receives the sequential data. In an exemplary aspect, the first status circuit generates an available signal that is asserted to indicate the second data storage circuit is available to receive the sequential data. In a further exemplary aspect, the second data storage circuit receives the sequential data in response to the available signal being asserted and the ready signal indicating the downstream circuit is not ready to receive the sequential data on the data output. For example, the second data storage circuit receives the sequential data only in response to the available signal being asserted and the ready indicating the downstream circuit is not ready to receive the sequential data. Limiting conditions in which the sequential data is stored in the second data storage circuit significantly reduces power consumption of the data pipeline circuit.

Figure 1:
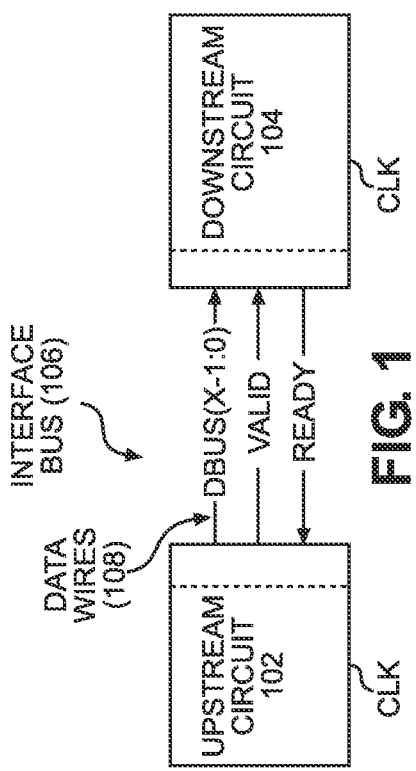
FIG. 1 is a block diagram of an upstream circuit transferring sequential data to a downstream circuit on an interface bus including a data bus, a ready signal and a valid signal.
Figure 2:
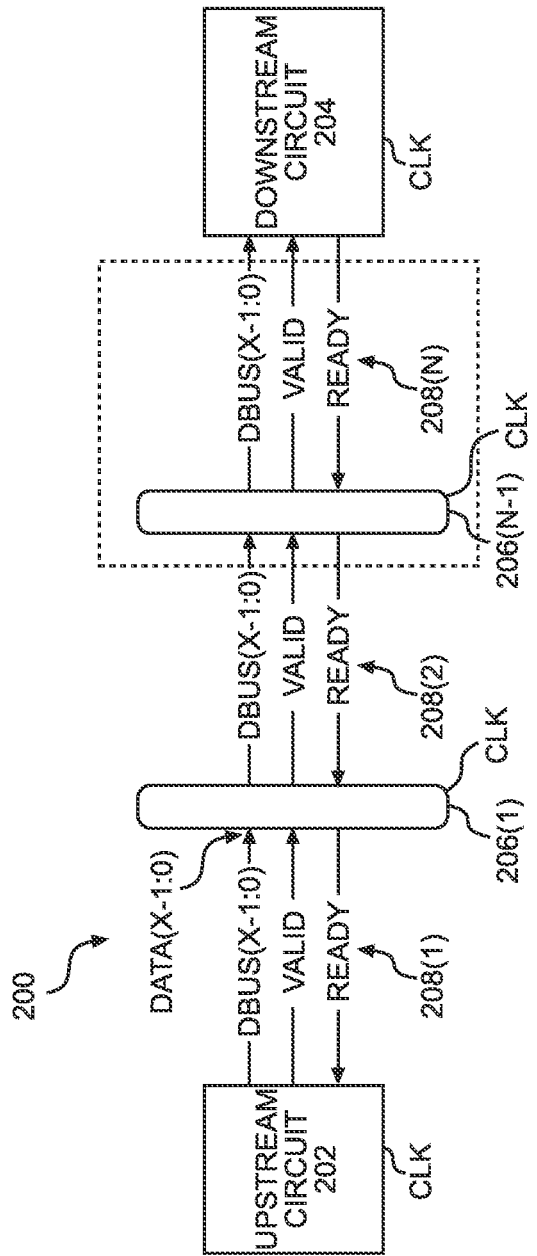
FIG. 2 is a block diagram of an upstream circuit transferring sequential data to a downstream circuit on a series of interface buses separated by one or more data pipeline circuits to increase data transfer frequency.

FIG. 2 is a block diagram of an interface 200 for transferring sequential data (e.g., digital data) DATA(X-1:0) between an upstream circuit 202 and a downstream circuit 204 in an integrated circuit (IC) (not shown). Referring back to FIG. 1, interface bus 106 directly couples to the upstream circuit 102 and the downstream circuit 104. The sequential data DATA(X-1:0) is synchronously transferred from the upstream circuit 102 to the downstream circuit 104 based on the system clock signal CLK. However, at high clock frequencies, data on the data bus DBUS(X-1:0) from the upstream circuit 102 in FIG. 1 may not be able to reliably stabilize at the downstream circuit 104 within a single period of the system clock signal CLK due to long wire lengths on the data bus DBUS(X-1:0). The interface 200 including one or more data pipeline circuits 206(1)-206(N-1) is employed as an alternative to the interface bus 106 in FIG. 1. The interface 200 includes a plurality (N) of interface buses 208(1)-208(N) separated by the data pipeline circuits 206(1)-206(N-1). Each of the interface buses 208(1)-208(N) corresponds to the interface bus 106 in FIG. 1, including a data bus DBUS(X-1:0), a valid signal VALID, and a ready signal READY.

Each of the data pipeline circuits 206(1)-206(N-1) in the interface 200 stores the sequential data DATA(X-1:0) transferred on the data bus DBUS(X-1:0), adding latency in the data transfer between the upstream circuit 202 and the downstream circuit 204 equal in time to one period or cycle of the system clock signal CLK. However, by separating the interface buses 208(1)-208(N) with data pipeline circuits 206(1)-206(N-1), each of the interface buses 208(1)-208(N) is shorter in length than the interface bus 106 in FIG. 1, such that the sequential data DATA(X-1:0) can propagate and stabilize more quickly on the interface buses 208(1)-208(N) than on the interface bus 106. Thus, a frequency of the system clock signal CLK for sequential logic in the IC can be increased.

The interface 200 may include a single data pipeline circuit 206(1) coupled directly to the upstream circuit 202 and to the downstream circuit 204. In general, the data pipeline circuit 206(1) is coupled directly to the upstream circuit 202 by an interface bus 208(1) and the data pipeline circuit 206(N-1) is directly coupled to the downstream circuit 204 by the interface bus 208(N). If (N-1)=2, as in FIG. 2, the data pipeline circuit 206(1) and the data pipeline circuit 206(N-1) are directly coupled to each other by the interface bus 208(2). When the upstream circuit 202 is ready to send the sequential data DATA(X-1:0) and the downstream circuit 204 is ready to receive, one bit of the sequential data DATA(X-1:0) is passed on each bit of the data bus DBUS(X-1:0) in each cycle of the system clock signal CLK. In respective cycles of the system clock signal CLK, the sequential data DATA(X-1:0) is passed from the upstream circuit 202 to the data pipeline circuit 206(1), to the data pipeline circuit 206(2), and finally to the downstream circuit 204. When (N-1)>2, one or more additional data pipeline circuits 206(2)-206(N-2) are coupled between the data pipeline circuit 206(1) and the data pipeline circuit 206(N-1) and the data transfer from the upstream circuit 202 to the downstream circuit 204 is extended by additional cycles of the system clock signal CLK.

FIG. 3 is a schematic logic diagram of a data pipeline circuit 300 for data transfer that receives sequential data DATA(0) in a first data latch 302(1). To save power, the data pipeline circuit 300 receives the sequential data DATA(0) in a second data latch 302(2) in response to an indication that the second data latch is available and a ready signal READY indicating a downstream circuit is not ready to receive the sequential data DATA(0). As an example, the data pipeline circuit 300 may be employed between two interface buses 208(1)-208(N) to transfer data between an upstream circuit (not shown) and a downstream circuit (not shown). The upstream circuit and the downstream circuit may respectively be other data pipeline circuits 300 or other circuits comprising a source circuit or destination circuit of the data transfer.

The data pipeline circuit 300 operates in accordance with any of the data pipeline circuits 206(1)-206(N-1) in FIG. 2. The data pipeline circuit 300 includes an upstream interface circuit 304, a downstream interface circuit 306, and a logic circuit 308. The logic circuit 308 in FIG. 3 is capable of controlling the transfer of any number X (e.g., 64, 256, or 1024) of bits of sequential data DATA(X-1:0) from the interface bus 310(U) to the interface bus 310(D). The logic circuit 308 in FIG. 3 is configured to transfer the sequential data DATA(0) (one bit in width) from the data bus DBUSU(0) to the data bus DBUSD(0) but the description herein for transferring the sequential data DATA(0) corresponds to transferring any number X of bits of the sequential data DATA(X-1:0).

The upstream interface circuit 304 can be coupled to an interface bus 310(U) on the upstream side of the data pipeline circuit 300 and the downstream interface circuit 306 can be coupled to an interface bus 310(D) on the downstream side of the data pipeline circuit 300. The interface buses 310(U) and 310(D) correspond to the interface bus 106 in FIG. 2 and the interface buses 208(1)-208(N) in FIG. 2. The sequential data DATA(0) is passed unidirectionally from a data bus DBUSU(0) in the interface bus 310(U) through the upstream interface circuit 304 to the logic circuit 308. Under the control of the logic circuit 308, the sequential data DATA(0) is transferred to the downstream interface circuit 306, and then to a data bus DBUSD(0) in the interface bus 310(D).

The upstream interface circuit 304 includes a data input INDATA coupled to the data bus DBUSU(0), and a data valid input INVLD that receives the valid signal VALID of the interface bus 310(U). The upstream interface circuit 304 also includes a ready output INRDY to receive the ready signal READY in the interface bus 310(U). The valid signal VALID is asserted by the upstream interface circuit 304 to indicate the sequential data DATA(0) is valid on the data input INDATA during a cycle of the system clock signal CLK in which the valid signal VALID is asserted. The ready signal READY being asserted on the ready output INRDY in a cycle indicates that the sequential data DATA(0) on the data bus DBUSU(0) is received in the data pipeline circuit 300 in that cycle. Thus, the sequential data DATA(0) is successfully transferred on the data bus DBUSU(0) in a cycle in which both the valid signal VALID is asserted by the upstream circuit interface circuit 304 and the ready signal READY is asserted. by the data pipeline circuit 300. The upstream interface circuit 304 also includes a reset input RESET providing a reset signal 312 that is explained below.

As an aside, the term "asserted", as used herein, refers to a binary logic signal being set to a binary "1" state (e.g., corresponding to a voltage level) to assert that a condition exists and "de-asserted" or set to a binary "0" state to indicate the condition does not exist. For example, an asserted signal may have a "high" voltage (e.g., 5 volts (V)) and a de-asserted signal have a "low" voltage (e.g., 0 V). Alternatively, a signal may be asserted by being set to a low voltage and de-asserted by being set to a high voltage.

Returning to a discussion of FIG. 3, the downstream interface circuit 306 includes a data output OUTDATA and a ready input OUTRDY. The data output OUTDATA and the ready input OUTRDY are coupled to the data bus DBUSD (0) and the ready signal READY, respectively, in the interface bus 310(D). The downstream interface circuit 306 also includes a data valid output OUTVLD coupled to the valid signal VALID in the interface bus 310(D). The downstream interface circuit 306 transfers the sequential data DATA(0) received on the upstream interface circuit 304 to a downstream circuit (not shown) on the data output OUTDATA. The valid signal VALID is asserted in a cycle to indicate to the downstream circuit that the sequential data DATA(0) is valid on the data bus DBUSD(0) in that cycle. The ready signal READY on the ready input OUTRDY indicates the downstream circuit is ready to receive the sequential data DATA(0). Thus, the sequential data DATA(0) is successfully transferred on the data bus DBUSD(0) in a cycle in which both the valid signal VALID is asserted by the data pipeline circuit 300 and the ready signal READY is asserted by the downstream circuit.

The logic circuit 308 is coupled to the upstream interface circuit 304 and the downstream interface circuit 306. The logic circuit 308 transfers the sequential data DATA(0) from the upstream interface circuit 304 to the downstream interface circuit 306 as a sequence of data bits during respective cycles of the system clock signal CLK. The logic circuit 308 is capable of transferring a maximum of one digital data bit per cycle. The logic circuit 308 includes a first data storage circuit 302(1) and a second data storage circuit 302(2). Storage circuits such as the first and second data storage circuits 302(1) and 302(2) can be latches, flip-flops, single bit registers, or any type of sequential logic circuit but are referred to herein as latches for simplicity. In general, latches receive binary input data (e.g., a "high" or "low" voltage level) on a latch input D and transfer the binary input data from the latch input D to a latch output Q as binary output data in response to activation of the system clock signal CLK, if the system clock signal CLK is enabled. In FIG. 3, the first data storage circuit 302(1), the second data storage circuit 302(2) and other storage circuits discussed below include a latch clock CKEN, which is an input that receives a corresponding enabled system clock signals CLK_EN_(1), CLK_EN_(2), etc. from an external circuit 311. The external circuit 311 includes a clock input CK that receives the system clock signal CLK and an enable input EN. Each of the external circuits 311 receives a corresponding signal on the enable input EN to enable the system clock signal CLK in appropriate cycles. In an alternative example of a latch or storage circuit, the functionality of the external circuit 311 may be internal to a latch, and the latch includes the clock input CK and the enable input EN. Thus, the system clock signal CLK may be enabled (or gated) internal to or external to a latch. A latch maintains (e.g., stores) the same data on the latch output Q until the system clock signal CLK is activated again, if enabled by a corresponding the enable input EN.

Herein, the first data storage circuit 302(1) and the second data storage circuit 302(2) are also referred to as a first data latch 302(1) and a second data latch 302(2). In an exemplary aspect disclosed herein, the second data latch 302(2) receives the sequential data DATA(0) from the upstream interface circuit 304 under certain limited conditions (explained further below) to avoid power consumption that would result from enabling the second data latch 302(2) to receive the sequential data DATA(0) from the first data latch 302(1) in every cycle of the system clock signal CLK. If the second data latch 302(2) was configured to automatically receive data from the first data latch 302(1) in every cycle of the system clock signal CLK, power would be wasted anytime the sequential data DATA(0) is stored in the second data latch 302(2) unnecessarily. Considering that such power consumption would be multiplied by the number (X) of data bits in the interface bus 310(D), it can be seen that a large amount of power is saved by limiting the conditions in which the second data latch 302(2) is enabled to receive the sequential data DATA(0).

The latch input D of the first data latch 302(1) is coupled to the data input INDATA in the upstream interface circuit 304 such that the first data latch 302(1) is configured to receive the sequential data DATA(0) from the upstream interface circuit 304. The sequential data DATA(0) received at the latch input D of the first data latch 302(1) is passed to the latch Output Q of the first data latch 302(1) in response to activation of an enabled system clock signal CLK_EN_ (1) coupled to the latch clock CKEN of the first data latch 302(1). The enabled system clock signal CLK_EN_(1) is activated by the external circuit 311 in response to the system clock signal CLK being activated while an enable signal 314 supplied to the enable input EN of the external circuit 311 is asserted. The latch output Q of the first data latch 302(1) is coupled to the latch input D of the second data latch 302(2) and is also coupled to a first input 316(1) of a multiplexor 318. The latch output Q of the second data latch 302(2) is coupled to a second input 316(2) of the multiplexor 318. An output 320 of the multiplexor 318 is coupled to the data output OUTDATA in the downstream interface circuit 306. Thus, the sequential data DATA(0) is provided to the data bus DBUSD(0) in the downstream interface circuit 306 from the multiplexor 318. The multiplexor 318 can receive the sequential data DATA(0) from either the first data latch 302(1) or the second data latch 302(2).

Operation of the data pipeline circuit 300 and the interface buses 310(U) and 310(D) is sequential, meaning that states of the logic circuit 308 and the interface buses 310(U) and 310(D) in a second cycle of a system clock signal CLK are dependent, at least in part, on states of the logic circuit 308 and the interface buses 310(U) and 310(D) in a first cycle of the system clock signal CLK before the second cycle. In another aspect, sequential operation means that the data pipeline circuit 300 transfers the sequential data DATA(0) as a sequence of digital data bits at a maximum rate of one bit per cycle of the system clock signal CLK. However, maintaining such maximum rate depends on the downstream circuit asserting the ready signal READY on the ready input OUTRDY in every cycle and on the upstream circuit providing the sequential data DATA(0) on the data bus DBUSU (0) and asserting the valid signal VALID coupled to the data valid input INVLD in every cycle.

The limited conditions in which the second data latch 302(2) receives data are explained in the context of an example in which the ready signal READY received on the ready input OUTRDY is not asserted (i.e., is de-asserted) in a first cycle. The de-asserted ready signal READY indicates that a first sequential data DATA(0)A on the data bus DBUSD(0) is not received by a downstream circuit in the first cycle. Thus, in this example, the data pipeline circuit 300 is expected to provide the first sequential data DATA (0)A on the data bus DBUSD(0) in the second cycle following the first cycle and possibly in subsequent cycles until after a cycle in which the ready signal READY is asserted by the downstream circuit. Additionally, the data pipeline circuit 300 will de-assert the ready signal READY to the upstream circuit in a next cycle after the ready signal READY on the ready input OUTRDY is de-asserted.

In the example above, if the ready signal READY in the upstream interface circuit 304 is asserted in the first cycle, the data pipeline circuit 300 is expected to receive a second sequential data DATA(0)B on the data bus DBUSU(0). A third sequential data DATA(0)C may be provided on the data bus DBUSU(0) in the second cycle. However, because the first sequential data DATA(0)A needs to be driven again on the data bus DBUSD(0) in the second cycle, the second sequential data DATA(0)B needs to be held in the logic circuit 308 until it can be transferred. In this condition, the second data latch 302(2) receives the first sequential data DATA(0)A from the upstream interface circuit 304 (i.e., by way of the first data latch 302(1)). This condition occurs in response to: 1) the ready signal READY on the ready input OUTRDY being de-asserted to indicate the downstream circuit is not ready to receive the first sequential data DATA(0) on the data output OUTDATA and 2) a first status circuit 322 asserts an available signal 324.

The available signal 324 indicates that the second data storage circuit 302(2) is available to receive the first sequential data DATA(0)A. The first status circuit 322 includes a first status storage circuit 326, also referred to herein as a first status latch 326, that asserts the available signal 324 in a second cycle of the system clock signal CLK in response to the ready signal READY on the ready input OUTRDY indicating the downstream circuit is ready to receive the output data signal in a first cycle before the second cycle. In the example, the first cycle is immediately before the second cycle.

The available signal 324 and the ready signal READY from the ready input OUTRDY are both provided to a NOT-OR (NOR) gate 328. In response to the available signal 324 being asserted, and the ready signal READY on the ready input OUTRDY indicating the downstream circuit is not ready to receive the first sequential data DATA(0)A on the data output OUTDATA, the NOR gate 328 asserts an enable signal 330 on the enable input EN of the external circuit 311 coupled to the second data latch 302(2). In response to the system clock signal CLK being activated while the enable signal 330 is asserted, an enabled system clock signal CLK_EN_(2) is activated on the latch clock CKEN of the second data latch 302(2). Thus, the first sequential data DATA(0)A is received on the latch input D in the second data latch 302(2) in response to the latch clock CKEN of the second data latch 302(2) receiving an enabled system clock signal CLK_EN_(2). The enabled system clock signal CLK_EN_(2) is asserted in response to the system clock signal CLK being activated while the available signal 324 is asserted and the ready signal READY on the ready input OUTRDY is de-asserted.

In this way, the second data latch 302(2) is employed to drive the first sequential data DATA(0)A on the data bus DBUSD(0) in the second cycle, while the second sequential data DATA(0)B is stored in the first data latch 302(1) and the third sequential data DATA(0)C is on the data bus DBUSU(0). In some examples, the second data latch 302(2) receives the sequential data DATA(0) only in response to the available signal 324 being asserted and the ready signal READY indicating the downstream circuit is not ready to receive the sequential data DATA(0) on the data output OUTDATA when the system clock signal CLK is activated. The multiplexor 318 also includes a control input CTL that receives the available signal 324. The multiplexor 318 generates the sequential data DATA(0) on the output 320 and on the data output OUTDATA of the downstream interface circuit 306 based on the available signal 324.

The logic circuit 308 also includes a second status circuit 331 including a second status storage circuit ("second status latch") 332, which receives the valid signal VALID on the data valid input INVLD on the latch input D of the second status latch 332. In response to the valid signal VALID being asserted in a first cycle, the latch output Q of the second status latch 332 asserts the valid signal VALID on the data valid output OUTVLD in a second cycle. The valid signal VALID on the data valid output OUTVLD is also asserted in response to the available signal 324 being de-asserted. The ready signal READY on the ready output INRDY is de-asserted in response to the second status latch 332 being asserted and the available signal 324 indicating the second data latch 302(2) is not available to receive sequential data DATA(0).

The reset signal 312 mentioned above is provided to initialize a state of the first and second data latches 302(1) and 302(2) and the first and second status latches 326 and 332, such as upon application of power to the data pipeline circuit 300. In addition to the first and second data latches 302(1) and 302(2) and the first and second status latches 326 and 332, the logic circuit 308 includes NOT-AND (NAND) gate 334, AND gates 336 and 338, NOR gate 340, and OR gates 342, 344 and 346 that, in combination, cause the data pipeline circuit 300 to function as described above. Details of operation of each of such gates should be readily understood and are not specifically described herein.

Figure 4:
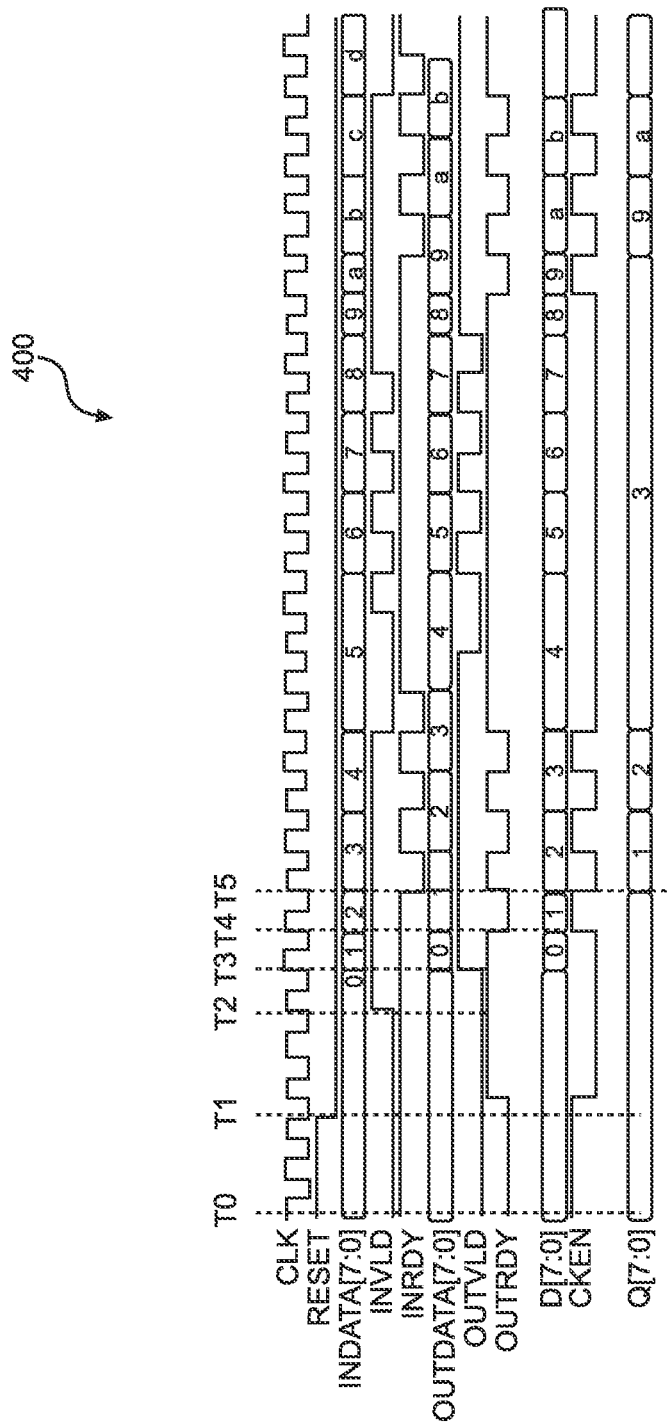
FIG. 4 is a timing diagram illustrating signals of the data pipeline circuit in FIG. 3 during sequential data transfer between an upstream circuit and a downstream circuit.

A simulation 400 of the operation of the data pipeline circuit 300 is illustrated in the timing diagram in FIG. 4, which includes signals of the upstream interface circuit 304, the downstream interface circuit 306, and the second data latch 302(2) of the logic circuit 308. In the simulation 400 in FIG. 4, the data input INDATA and the data output OUTDATA are each 8 bits in width and designated as INDATA(7:0) and OUTDATA(7:0) in FIG. 4.

The simulation 400 begins at time T0 with the reset signal 312 on the reset input RESET being asserted to reset the first and second status latches 326 and 332. At time T1 the reset input RESET is de-asserted. At time T2 the data valid input INVLD is asserted to indicate that a first sequential data DATA(7:0)="0" is valid on the data input INDATA(7:0) and the ready signal READY on the ready output INRDY is asserted to indicate that the data pipeline circuit 300 is receiving the first sequential data DATA(7:0)="0".

At time T3 the valid signal VALID on the data valid output OUTVLD is asserted to indicate to the downstream circuit that the first sequential data DATA(7:0)="0" is valid on the data output OUTDATA. The ready signal READY is asserted on the ready input OUTRDY indicating that the downstream circuit can receive the first sequential data DATA(7:0)="0". Also at time T3, the data valid input INVLD is asserted to indicate that a second sequential data DATA(7:0)="1" is valid on the data input INDATA(7:0) and the ready signal READY on the ready output INRDY is asserted to indicate that the data pipeline circuit 300 is receiving the second sequential data DATA(7:0)="1".

At time T4, the data valid input INVLD is asserted to indicate that a third sequential data DATA(7:0)="2" is valid on the data input INDATA(7:0) and the ready signal READY on the ready output INRDY is asserted to indicate that the data pipeline circuit 300 is receiving the third sequential data DATA(7:0)="2". Also at time T4, the valid signal VALID on the data valid output OUTVLD is asserted to indicate to the downstream circuit that the second sequential data DATA(7:0)="1" is valid on the data output OUTDATA but the ready signal READY on the ready input OUTRDY has been de-asserted by the downstream circuit. As discussed above, the second data latch 302(2) in FIG. 3 receives the sequential data DATA(X-1:0) in response to the ready signal READY on the ready input OUTRDY being de-asserted when the available signal 324 indicates the second data latch 302(2) is available. It should be noted with reference to the logic diagram in FIG. 3, that the available signal 324 is a low-active signal that is asserted (binary "1") when the latch output Q of the first status latch 326 is at a low voltage (e.g., 0 V). However, the first status latch 326 may also generate the available signal 324 as a high-active signal. The latch clock CKEN of the second data latch 302(2) indicates that the available signal 324 is asserted while the ready signal READY on the ready input OUTRDY is de-asserted, and this is a condition in which the second sequential data DATA(7:0)="1" is generated on the latch output Q of second data latch 302(2). In some examples, the latch clock CKEN of the second data latch 302(2) is only enabled when the available signal 324 is asserted and the ready signal READY on the ready input OUTRDY is de-asserted.

Further details of operation of the data pipeline circuit 300 may be understood with further study of the simulation 400 in FIG. 4 but will not be described further herein.

Figure 5:
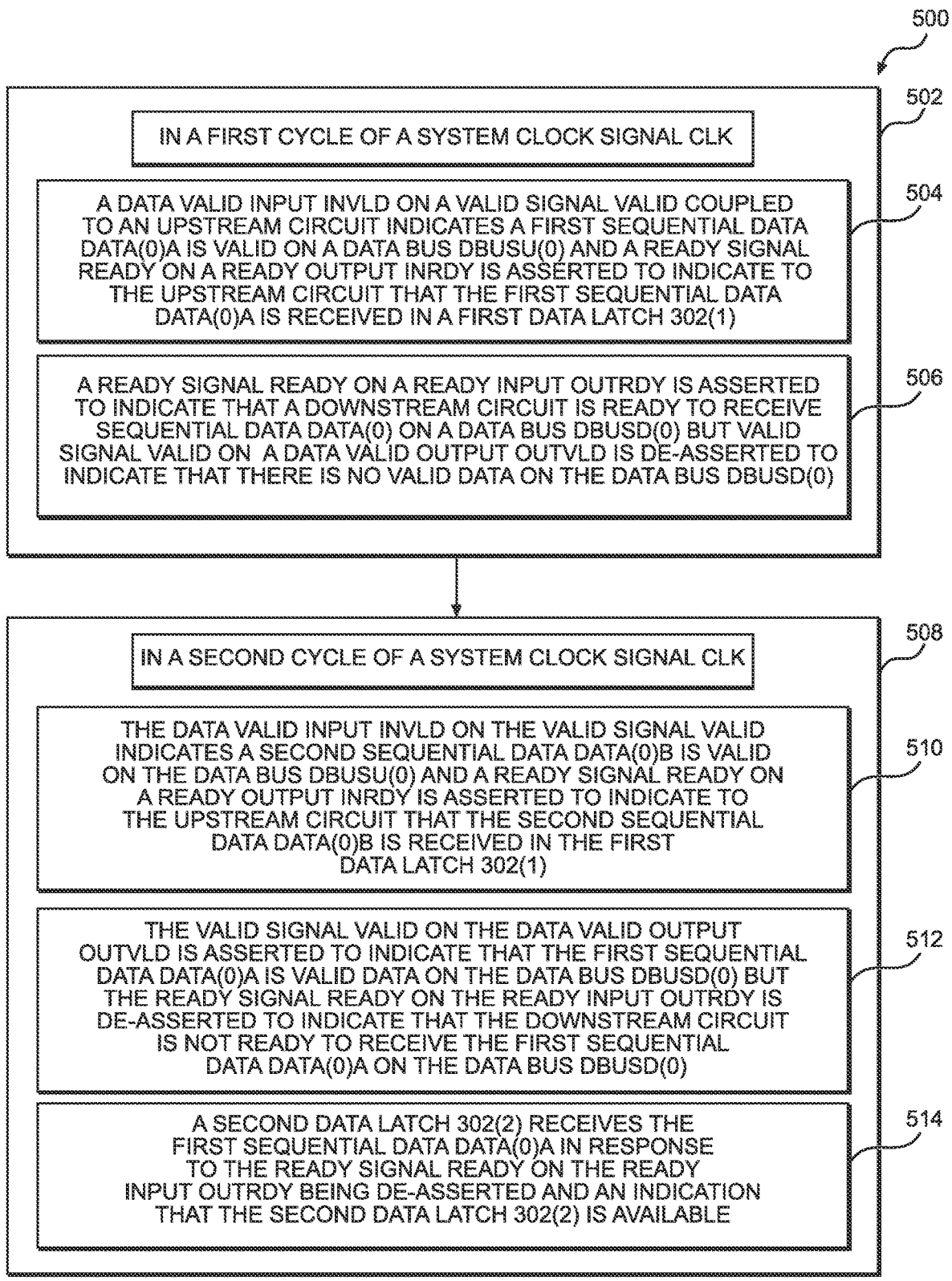
FIG. 5 is a flowchart illustrating a method of operation of a data pipeline circuit including first and second data latches that reduces power consumption by receiving data in the second data latch in response to a ready signal from a downstream circuit when the second data latch is available.

FIG. 5 is a flowchart illustrating a method 500 of storing the sequential data DATA(0) in a second data latch 302(2) in the data pipeline circuit 300 in FIG. 3.

In the method 500, in a first cycle of a system clock signal CLK (block 502), a data valid input INVLD on a valid signal VALID coupled to an upstream circuit indicates a first sequential data DATA(0)A is valid on a data bus DBUSU(0) and a ready signal READY on a ready output INRDY is asserted to indicate to the upstream circuit that the first sequential data DATA(0)A is received in a first data latch 302(1) (block 504). Also in the first cycle, a ready signal READY on a ready input OUTRDY is asserted to indicate that a downstream circuit is ready to receive sequential data DATA(0) on a data bus DBUSD(0) but valid signal VALID on a data valid output OUTVLD is de-asserted to indicate that there is no valid data on the data bus DBUSD(0) (block 506).

In a second cycle of the system clock signal CLK (block 508), in the method 500, the data valid input INVLD on the valid signal VALID indicates a second sequential data DATA(0)B is valid on the data bus DBUSU(0) and a ready signal READY on a ready output INRDY is asserted to indicate to the upstream circuit that the second sequential data DATA(0)B is received in the first data latch 302(1) (block 510). Also in the second cycle, the valid signal VALID on the data valid output OUTVLD is asserted to indicate that the first sequential data DATA(0)A is valid data on the data bus DBUSD(0) but the ready signal READY on the ready input OUTRDY is de-asserted to indicate that the downstream circuit is not ready to receive the first sequential data DATA(0)A on the data bus DBUSD(0) (block 512). Also in the second cycle, a second data latch 302(2) receives the first sequential data DATA(0)A in response to the ready signal READY on the ready input OUTRDY being de-asserted and an indication that the second data latch 30:2(2) is available (block 514).

FIG. 6 is a schematic logic diagram of another exemplary data pipeline circuit 600 for data transfer that receives sequential data DATA(0) in a first data latch 602(1) and, to save power, receives the sequential data DATA(0) in a second data latch 602(2) in response to an indication that the second data latch 602(2) is available and a ready signal READY indicating a downstream circuit is not ready to receive the sequential data DATA(0). From an external perspective, the data pipeline circuit 600 operates in accordance with any of the data pipeline circuits 206(1)-206(N-1) in FIG. 2 and the data pipeline circuit 300 in FIG. 3. The data pipeline circuit 600 includes an upstream interface circuit 604, a downstream interface circuit 606, and a logic circuit 608. The upstream interface circuit 604 can be coupled to an interface bus 610(U) on the upstream side of the data pipeline circuit 600 and the downstream interface circuit 606 can be coupled to an interface bus 610(D) on the downstream side of the data pipeline circuit 600. The upstream interface circuit 604 and the downstream interface circuit 606 correspond to the upstream interface circuit 304 and a downstream interface circuit 306 in FIG. 3. That is, the upstream interface circuit 604 includes a data input INDATA, a data valid input INVLD, a ready output INRDY, and a reset input RESET. The downstream interface circuit 606 includes a data output OUTDATA, a data valid output OUTVLD, and a ready input OUTRDY.

The logic circuit 608 is coupled to the upstream interface circuit 604 and the downstream interface circuit 606. The logic circuit 608 in FIG. 6 is capable of controlling the transfer of any number X (e.g., 64, 256, or 1024) of bits of sequential data DATA(X-1:0) from the interface bus 610(U) to the interface bus 610(D), but the example in FIG. 6 is described with regard to transferring the sequential data DATA(0) from the data bus DBUSU(0) to the data bus DBUSD(0).

The logic circuit 608 includes the first data storage circuit 602(1) and the second data storage circuit 602(2), which are also referred to as a first data latch 602(1) and a second data latch 602(2), respectively. In an exemplary aspect disclosed herein, conditions in which the second data latch 602(2) receives the sequential data DATA(0) from the upstream interface circuit 604 are limited to avoid power consumption that would result from clocking/enabling the second data latch 602(2) to receive the sequential data DATA(0) in every cycle of the system clock signal CLK.

The logic circuit 608 includes a multiplexor 614 including a first input 616(1) and a second input 616(2). The first and second data latches 602(1) and 602(2) each include a latch input D, a latch output Q, and a latch clock CKEN. The data input INDATA is coupled to the first input 616(1) of the multiplexor 614 and also to the latch input D of the second data latch 602(2). The latch output Q of the second data latch 602(2) is coupled to the second input 616(2) of the multiplexor 614. Thus, the multiplexor 614 receives the sequential data DATA(0) from the data input INDATA and from the second data latch 602(2). The multiplexor 614 also includes a control input CTL coupled to the available signal 624 and an output 618 coupled to the latch input D of the first data latch 602(1). Thus, the multiplexor 614 selects the sequential data DATA(0) to be provided to the first data latch 602(1), from either the data input INDATA or the second data latch 602(2), based on the available signal 624. The first data latch 602(1) generates the sequential data DATA(0) on the data output OUTDATA of the downstream interface circuit 606.

Positioning the multiplexor 614 differs from a position of the multiplexor 318 in the data pipeline circuit 300 in FIG. 3. Specifically, positioning the multiplexor 614 before the first data latch 602(1) adds a propagation delay of the multiplexor 614 between the data input INDATA and the first data latch 602(1), whereas a propagation delay of the multiplexor 318 in FIG. 3 is inserted between the first and second data latches 302(1) and 302(2) and the data output OUTDATA. The data pipeline circuit 300 or the data pipeline circuit 600 may be selected for external timing characteristics, depending on design requirements, and both examples provide a power savings benefit due to the second data latch 602(2) receiving the sequential data DATA(0) in certain conditions.

The second data latch 602(2) receives the sequential data DATA(0) from the data input INDATA in response to an enabled system clock signal 620 coupled to the latch clock CKEN. This enabled system clock signal 620 is asserted in response to the system clock signal CLK while: 1) the ready signal READY on the ready input OUTRDY is asserted to indicate the downstream circuit is not ready to receive the sequential data DATA(0) on the data output OUTDATA, and 2) a first status circuit 622 asserts an available signal 624 to indicate that the second data storage circuit 602(2) is available to receive the sequential data DATA(0). The first status circuit 622 includes a first status storage circuit 626, also referred to as a first status latch 626, that asserts the available signal 624 in a second cycle of the system clock signal UK in response to the ready signal READY on the ready input OUTRDY indicating the downstream circuit is ready to receive the output data signal in a first cycle.

In an example, in a cycle in which the first status latch 626 is asserting the (low-active) available signal 624 and the ready signal READY on the ready input OUTRDY is asserted, the multiplexor 614 couples the first sequential data DATA(0)A from the upstream interface circuit 604 to the latch input D of the first data latch 602(1). The latch clock CKEN of the first data latch 602(1) is asserted such that the first data latch 602(1) receives the first sequential data DATA(0)A, and the first data latch 602(1) drives the first sequential data DATA(0)A on the data output OUTDATA in a second cycle.

In an alternative example, if the available signal 624 is asserted but the ready signal READY on the ready input OUTRDY is not asserted, indicating the first data latch 602(1) will need to retain a first sequential data DATA(0)A, the enabled system clock signal 620 on the latch clock CKEN of the second data latch 602(2) is asserted and the second data latch 602(2) receives the second sequential data DATA(0)B. In the second cycle, the multiplexor 614 will pass the second sequential data DATA(0)B to the latch input D of the first data latch 602(1). After a cycle in which the ready signal READY on the ready input OUTRDY is asserted, indicating the downstream circuit received the first sequential data DATA(0)A, the first data latch 602(1) will receive the second sequential data DATA(0)B.

The logic circuit 608 also includes a second status circuit 628 including a second status storage circuit ("second status latch") 630, which receives the valid signal VALID on the data valid input INVLD from the upstream circuit. The latch output Q of the second status latch 630 can be asserted in a second cycle in response to the valid signal VALID being asserted in a first cycle. Since the data valid input INVLD indicates that the data input INDATA received valid sequential data DATA(0), the latch output Q of the second status latch 630 can cause the valid signal VALID on the data valid output OUTVLD to be asserted.

The logic circuit 608 also includes AND gates 632, 634, and 636, NAND gate 638, OR gates 640, 642, 644, and 646, NOR gate 648, and exclusive-OR (XOR) gate 650.

Further details of the operation of the data pipeline circuit 600 are illustrated in the timing diagram 700 in FIG. 7. Of particular note, at time T1, is that the enabled system clock signal 620 coupled to the latch clock CKEN of the second data latch 602(2) is asserted in response to the ready signal READY on the ready input OUTRDY being de-asserted and the available signal 624 (low-active) on the latch output Q of the first status latch 626 being asserted. The enabled system clock signal 620 is also asserted at other times but only under the same conditions of the ready signal READY on the ready input OUTRDY being de-asserted and the available signal 624 on the latch output Q of the first status latch 626 being asserted. Additional details of the operation of the data pipeline circuit 600 may be better understood with further review of the timing diagram 700 in FIG. 7 but are not further described herein.

FIG. 8 is a block diagram of an exemplary processor-based system 800 that includes a processor 802 (e.g., a microprocessor) that includes an instruction processing circuit 804. The processor-based system 800 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 800 includes the processor 802. The processor 802 represents one or more general-purpose processing circuits, such as a microprocessor, central processing unit, or the like. More particularly, the processor 802 may be an EDGE instruction set microprocessor, or other processor implementing an instruction set that supports explicit consumer naming for communicating produced values resulting from execution of producer instructions. The processor 802 is configured to execute processing logic in instructions for performing the operations and steps discussed herein. In this example, the processor 802 includes an instruction cache 806 for temporary, fast access memory storage of instructions accessible by the instruction processing circuit 804. Fetched or prefetched instructions from a memory, such as from a main memory 808 over a system bus 810, are stored in the instruction cache 806. Data may be stored in a cache memory 812 coupled to the system bus 810 for low-latency access by the processor 802. The instruction processing circuit 804 is configured to process instructions fetched into the instruction cache 806 and process the instructions for execution.

The processor 802 and the main memory 808 are coupled to the system bus 810 and can intercouple peripheral devices included in the processor-based system 800. As is well known, the processor 802 communicates with these other devices by exchanging address, control, and data information over the system bus 810. For example, the processor 802 can communicate bus transaction requests to a memory controller 814 in the main memory 808 as an example of a slave device. Although not illustrated in FIG. 8, multiple system buses 810 could be provided, wherein each system bus constitutes a different fabric. In this example, the memory controller 814 is configured to provide memory access requests to a memory array 816 in the main memory 808. The memory array 816 is comprised of an array of storage bit cells for storing data. The main memory 808 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 810. As illustrated in FIG. 8, these devices can include the main memory 808, one or more input device(s) 818, one or more output device(s) 820, a modem 822, and one or more display controllers 824, as examples. The input device(s) 818 can include any type of input device, including but not limited to input keys, switches, voice processors, etc. The output device(s) 820 can include any type of output device, including but not limited to audio, video, other visual indicators, etc. The modem 822 can be any device configured to allow exchange of data to and from a network 826. The network 826 can be any type of network, including but not limited to a wired or wireless network, a private or public network, a local area network (LAN), a wireless local area network (WLAN), a wide area network (WAN), a BLUETOOTH™ network, and the Internet. The modem 822 can be configured to support any type of communications protocol desired. The processor 802 may also be configured to access the display controller(s) 824 over the system bus 810 to control information sent to one or more displays 828. The display(s) 828 can include any type of display, including but not limited to a cathode ray tube (CRT), a liquid crystal display (LCD), a plasma display, etc.

The processor-based system 800 in FIG. 8 may include a set of instructions 830 to be executed by the processor 802 for any application desired according to the instructions. The instructions 830 may be stored in the main memory 808, processor 802, and/or instruction cache 806 as examples of a non-transitory computer-readable medium 832. The instructions 830 may also reside, completely or at least partially, within the main memory 808 and/or within the processor 802 during their execution. The instructions 830 may further be transmitted or received over the network 826 via the modem 822, such that the network 826 includes computer-readable medium 832.

While the computer-readable medium 832 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

Any ICs in the processor-based system 800 may include the data pipeline circuit 300 in FIG. 3 or the data pipeline circuit 600 in FIG. 6 to transfer data between an upstream circuit and a downstream circuit with reduced power consumption.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A data pipeline circuit configured to transfer sequential data from an upstream circuit to a downstream circuit in an integrated circuit, the data pipeline circuit comprising:
   an upstream interface circuit configured to receive sequential data from an upstream circuit;
   a downstream interface circuit comprising a data output and a ready input, the downstream interface circuit configured to transfer the sequential data received on the upstream interface circuit to a downstream circuit on the data output, wherein a ready signal on the ready input indicates the downstream circuit is ready to receive the sequential data; and
   a logic circuit coupled to the upstream interface circuit and the downstream interface circuit, the logic circuit comprising:
      a first data storage circuit configured to receive the sequential data from the upstream interface circuit;
      a second data storage circuit configured to receive the sequential data; and
      a first status circuit configured to assert an available signal to indicate the second data storage circuit is available to receive the sequential data;
      wherein the second data storage circuit is configured to receive the sequential data only in response to:
         the available signal being asserted; and
         the ready signal indicating the downstream circuit is not ready to receive the sequential data on the data output.

2. The data pipeline circuit of claim 1, wherein:
   the first status circuit comprises a first status storage circuit configured to assert the available signal in response to the ready signal indicating the downstream circuit is ready to receive the sequential data on the data output; and
   the first status storage circuit asserts the available signal.

3. The data pipeline circuit of claim 1, wherein the first status circuit comprises a first status storage circuit configured to assert the available signal in a second clock cycle in response to the ready signal indicating the downstream circuit is ready to receive the sequential data on the data output in a first clock cycle before the second clock cycle.

4. The data pipeline circuit of claim 1, wherein:
   the upstream interface circuit further comprises:
      a data input; and
      a valid input indicating valid data on the data input;
   the logic circuit further comprises a second status circuit comprising a second status storage circuit configured to receive the valid input and assert an output valid signal;
   the downstream interface circuit further comprises a valid output that is asserted to indicate valid data on the data output on the downstream interface circuit; and
   the valid output is asserted in response to an input valid signal on the valid input and in response to the available signal being asserted.

5. The data pipeline circuit of claim 4, wherein:
   the upstream interface circuit further comprises an upstream ready output configured to assert an upstream ready signal to indicate that the data pipeline circuit is ready to receive the sequential data on the data input;
   the upstream ready signal is de-asserted in response to the available signal being asserted.

6. A data pipeline circuit configured to transfer sequential data from an upstream circuit to a downstream circuit in an integrated circuit, the data pipeline circuit comprising:
   an upstream interface circuit configured to receive sequential data from an upstream circuit;
   a downstream interface circuit comprising a data output and a ready input, the downstream interface circuit configured to transfer the sequential data received on the upstream interface circuit to a downstream circuit on the data output, wherein a ready signal on the ready input indicates the downstream circuit is ready to receive the sequential data; and
   a logic circuit coupled to the upstream interface circuit and the downstream interface circuit, the logic circuit comprising:
      a first data storage circuit configured to receive the sequential data from the upstream interface circuit;

a second data storage circuit configured to receive the sequential data; and a first status circuit configured to assert an available signal to indicate the second data storage circuit is available to receive the sequential data;

wherein:

the second data storage circuit is configured to receive the sequential data in response to:

the available signal being asserted; and the ready signal indicating the downstream circuit is not ready to receive the sequential data on the data output;

the second data storage circuit is configured to receive the sequential data from the first data storage circuit; and the logic circuit further comprises a multiplexor configured to:

receive the sequential data from the first data storage circuit and the second data storage circuit; and generate the sequential data on the data output of the downstream interface circuit based on the available signal.

7. A data pipeline circuit configured to transfer sequential data from an upstream circuit to a downstream circuit in an integrated circuit, the data pipeline circuit comprising:

an upstream interface circuit configured to receive sequential data from an upstream circuit;

a downstream interface circuit comprising a data output and a ready input, the downstream interface circuit configured to transfer the sequential data received on the upstream interface circuit to a downstream circuit on the data output, wherein a ready signal on the ready input indicates the downstream circuit is ready to receive the sequential data; and a logic circuit coupled to the upstream interface circuit and the downstream interface circuit, the logic circuit comprising:

a first data storage circuit configured to receive the sequential data from the upstream interface circuit;

a second data storage circuit configured to receive the sequential data; and a first status circuit configured to assert an available signal to indicate the second data storage circuit is available to receive the sequential data;

wherein:

the second data storage circuit is configured to receive the sequential data in response to:

the available signal being asserted; and the ready signal indicating the downstream circuit is not ready to receive the sequential data on the data output;

the upstream interface circuit further comprises a data input;

the logic circuit further comprises a multiplexor configured to:

receive the sequential data from the data input and from the second data storage circuit; and select the sequential data provided to the first data storage circuit based on the available signal; and the first data storage circuit is configured to generate the sequential data on the data output of the downstream interface circuit.

8. An integrated circuit comprising:

an upstream circuit;

a downstream circuit; and a data pipeline circuit configured to transfer sequential data from the upstream circuit to the downstream circuit in an integrated circuit, the data pipeline circuit comprising:

an upstream interface circuit configured to receive sequential data from the upstream circuit;

a downstream interface circuit comprising a data output and a ready input, the downstream interface circuit configured to transfer the sequential data received on the upstream interface circuit to the downstream circuit on the data output, wherein a ready signal on the ready input indicates the downstream circuit is ready to receive the sequential data; and a logic circuit coupled to the upstream interface circuit and the downstream interface circuit, the logic circuit comprising:

a first data storage circuit configured to receive the sequential data from the upstream interface circuit;

a second data storage circuit configured to receive the sequential data; and a first status circuit configured to assert an available signal to indicate the second data storage circuit is available to receive the sequential data;

wherein the second data storage circuit is configured to receive the sequential data only in response to:

the available signal being asserted; and the ready signal indicating the downstream circuit is not ready to receive the sequential data on the data output.

9. The integrated circuit of claim 8, wherein:

the first status circuit comprises a first status storage circuit configured to assert the available signal in response to the ready signal indicating the downstream circuit is ready to receive the sequential data on the data output; and the first status storage circuit asserts the available signal.

10. The integrated circuit of claim 8, wherein the first status circuit comprises a first status storage circuit configured to assert the available signal in a second clock cycle in response to the ready signal indicating the downstream circuit is ready to receive the sequential data on the data output in a first clock cycle before the second clock cycle.

11. The integrated circuit of claim 8, wherein:

the upstream interface circuit further comprises:

a data input; and a valid input indicating valid data on the data input;

the logic circuit further comprises a second status circuit comprising a second status storage circuit configured to receive the valid input and assert an output valid signal;

the downstream interface circuit further comprises a valid output that is asserted to indicate valid data on the data output on the downstream interface circuit; and the valid output is asserted in response to an input valid signal on the valid input and in response to the available signal being asserted.

12. The integrated circuit of claim 11, wherein:

the upstream interface circuit further comprises an upstream ready output configured to assert an upstream ready signal to indicate that the data pipeline circuit is ready to receive the sequential data on the data input; and the upstream ready signal is de-asserted in response to the available signal being asserted.

13. The integrated circuit of claim 8, wherein:
the second data storage circuit is configured to receive the sequential data from the first data storage circuit; and
the logic circuit further comprises a multiplexor configured to:
receive the sequential data from the first data storage circuit and the second data storage circuit; and
generate the sequential data on the data output of the downstream interface circuit based on the available signal.

14. The integrated circuit of claim 8, wherein:
the upstream interface circuit further comprises a data input;
the logic circuit further comprises a multiplexor configured to:
receive the sequential data from the data input and from the second data storage circuit; and
select the sequential data provided to the first data storage circuit based on the available signal; and
the first data storage circuit is configured to generate the sequential data on the data output of the downstream interface circuit.

15. A method of transferring data from an upstream circuit to a downstream circuit in an integrated circuit, the method comprising:
receiving sequential data from an upstream circuit on an upstream interface circuit of a data pipeline circuit;
transferring the sequential data received from the upstream interface circuit to a downstream circuit on a downstream interface circuit, the downstream interface circuit comprising a data output and a ready input that receives a ready signal indicating the downstream circuit is ready to receive the sequential data;
receiving the sequential data in a first data storage circuit of a logic circuit that further comprises a second data storage circuit;
generating, in a first status circuit, an available signal that is asserted to indicate the second data storage circuit is available to receive the sequential data; and
receiving the sequential data in the second data storage circuit only in response to the available signal being asserted and the ready signal indicating the downstream circuit is not ready to receive the sequential data on the data output.

16. The method of claim 15, wherein generating the available signal in the first status circuit further comprises generating the available signal from a first status storage circuit configured to assert the available signal in response to the ready signal indicating the downstream circuit is ready to receive the sequential data on the data output.

17. The method of claim 16, further comprising the first status storage circuit asserting the available signal in a second clock cycle in response to the ready signal indicating the downstream circuit is ready to receive the output data signal in a first clock cycle immediately before the second clock cycle.

18. The method of claim 15, further comprising:
receiving, by a second status circuit, a valid input on the upstream interface circuit indicating the sequential data received from the upstream circuit is valid; and
asserting a valid output indicating data on the data output is valid is in response to an input valid signal on the valid input and in response to the available signal being asserted.

19. The method of claim 18, wherein:
asserting an upstream ready signal on an upstream ready output to indicate that the data pipeline circuit is ready to receive the sequential data on the data input; and
de-asserting the upstream ready signal in response to the available signal being de-asserted.

20. The method of claim 15, further comprising:
receiving, in a multiplexor, the sequential data from the first data storage circuit or the second data storage circuit; and
generating the sequential data on the data output of the downstream interface circuit based on the available signal.

21. The method of claim 18, wherein:
receiving, in a multiplexor, the sequential data from the data input or the second data storage circuit;
providing, to the first data storage circuit, the sequential data from the multiplexor based on the available signal; and
generating, from the first data storage circuit, the sequential data on the data output of the downstream interface circuit.

22. The data pipeline circuit of claim 6, wherein:
the first status circuit comprises a first status storage circuit configured to assert the available signal in response to the ready signal indicating the downstream circuit is ready to receive the sequential data on the data output; and
the first status storage circuit asserts the available signal.

23. The data pipeline circuit of claim 6, wherein the first status circuit comprises a first status storage circuit configured to assert the available signal in a second clock cycle in response to the ready signal indicating the downstream circuit is ready to receive the sequential data on the data output in a first clock cycle before the second clock cycle.

24. The data pipeline circuit of claim 6, wherein:
the upstream interface circuit further comprises:
a data input; and
a valid input indicating valid data on the data input;
the logic circuit further comprises a second status circuit comprising a second status storage circuit configured to receive the valid input and assert an output valid signal;
the downstream interface circuit further comprises a valid output that is asserted to indicate valid data on the data output on the downstream interface circuit; and
the valid output is asserted in response to an input valid signal on the valid input and in response to the available signal being asserted.

25. The data pipeline circuit of claim 24, wherein:
the upstream interface circuit further comprises an upstream ready output configured to assert an upstream ready signal to indicate that the data pipeline circuit is ready to receive the sequential data on the data input;
the upstream ready signal is de-asserted in response to the available signal being asserted.

26. The data pipeline circuit of claim 7, wherein:
the first status circuit comprises a first status storage circuit configured to assert the available signal in response to the ready signal indicating the downstream circuit is ready to receive the sequential data on the data output; and
the first status storage circuit asserts the available signal.

27. The data pipeline circuit of claim 7, wherein the first status circuit comprises a first status storage circuit configured to assert the available signal in a second clock cycle in response to the ready signal indicating the downstream circuit is ready to receive the sequential data on the data output in a first clock cycle before the second clock cycle.

28. The data pipeline circuit of claim 7, wherein:
the upstream interface circuit further comprises:
  a data input; and
  a valid input indicating valid data on the data input;
the logic circuit further comprises a second status circuit comprising a second status storage circuit configured to receive the valid input and assert an output valid signal;
the downstream interface circuit further comprises a valid output that is asserted to indicate valid data on the data output on the downstream interface circuit; and
the valid output is asserted in response to an input valid signal on the valid input and in response to the available signal being asserted.

29. The data pipeline circuit of claim 28, wherein:
the upstream interface circuit further comprises an upstream ready output configured to assert an upstream ready signal to indicate that the data pipeline circuit is ready to receive the sequential data on the data input;
the upstream ready signal is de-asserted in response to the available signal being asserted.

\* \* \* \* \*